United States Patent

[11] 3,555,974

[72] Inventor Francis A. Davis Jr.
    Lansdale, Pa.
[21] Appl. No. 775,748
[22] Filed Nov. 14, 1968
[45] Patented Jan. 19, 1971
[73] Assignee Paramount Packaging Corporation
    Chalfont, Pa.
    a corporation of Delaware

[54] METHOD AND APPARATUS FOR MAKING PLASTIC BAGS
    9 Claims, 14 Drawing Figs.
[52] U.S. Cl. .................................................. 93/8, 93/35
[51] Int. Cl. ...................................................... B31b 1/00
[50] Field of Search .......................................... 93/8, 35, -
    35(Inquired)

[56] References Cited
    UNITED STATES PATENTS
    3,023,679  3/1962  Piazze .......................... 93/35X
    3,395,622  8/1968  Kugler .......................... 93/35

*Primary Examiner*—Bernard Stickney
*Attorney*—Seidel and Gonda

ABSTRACT: Shaped gusset bags of heavy gauge material are made by separately welding a generally V-shaped notch in the top and bottom sections of the gusset, providing a short slit in the notches, providing pairs of transverse seam welds which intersect the notch welds, and then cutting along the notch welds and between the transverse seam welds. In another embodiment, the notch is welded and cut out at one station and then moved to a second station wherein the material is cut and welded transversely.

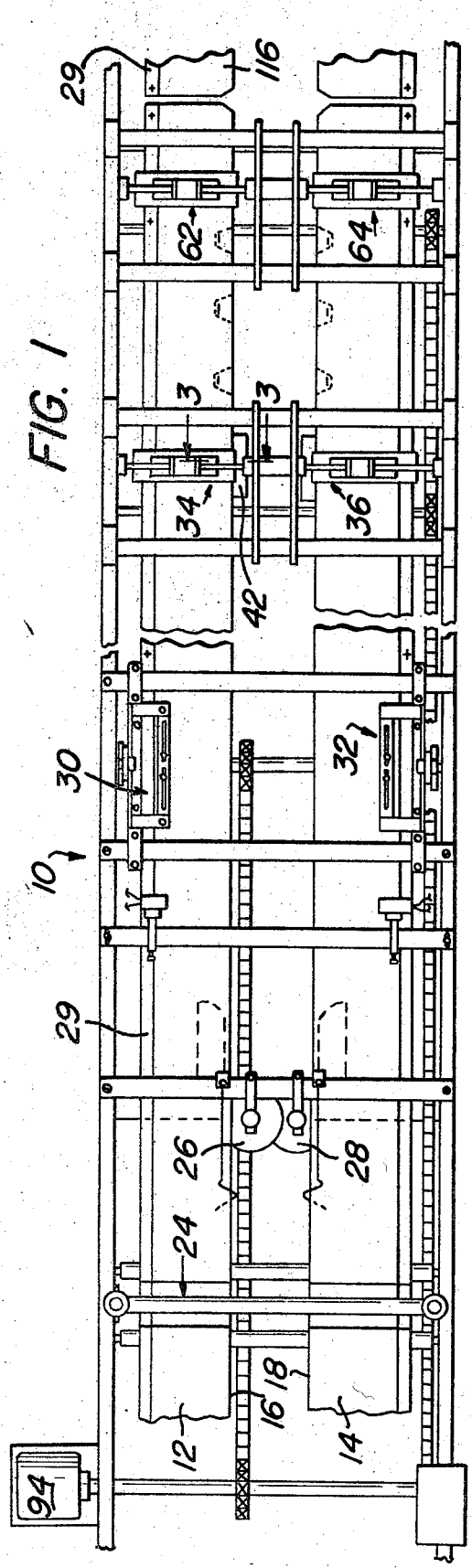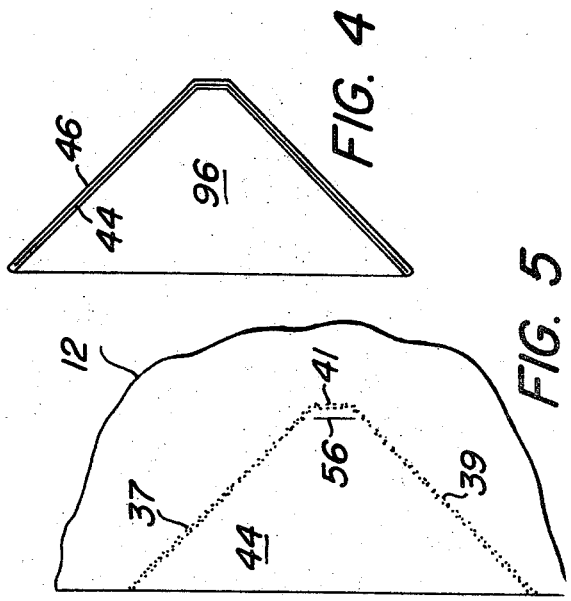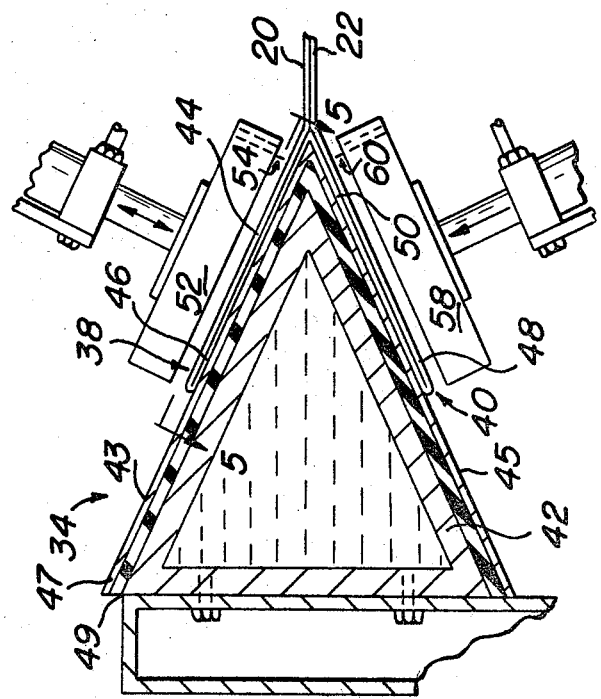

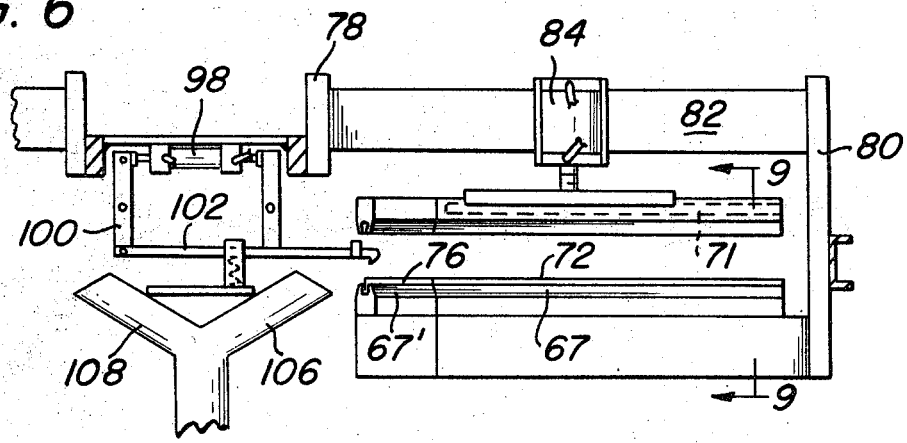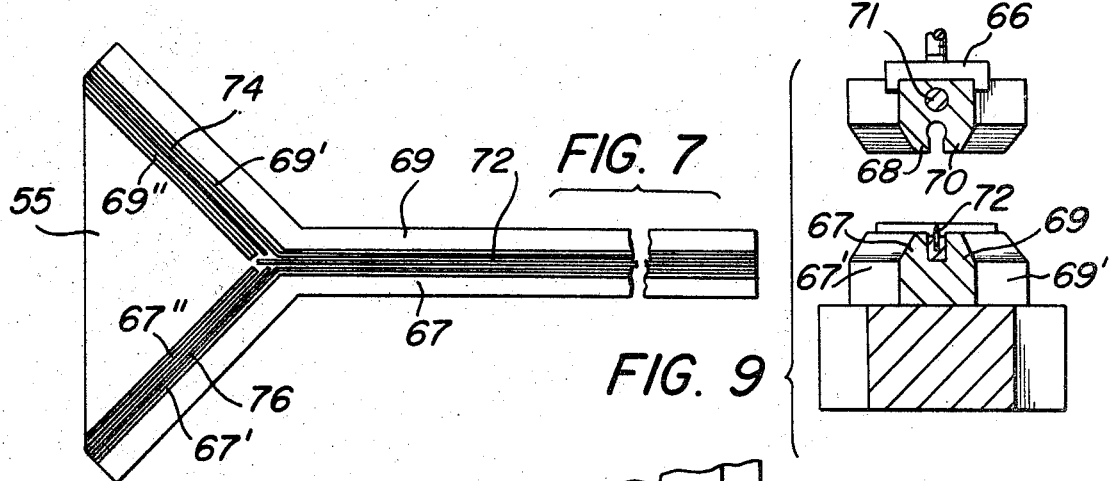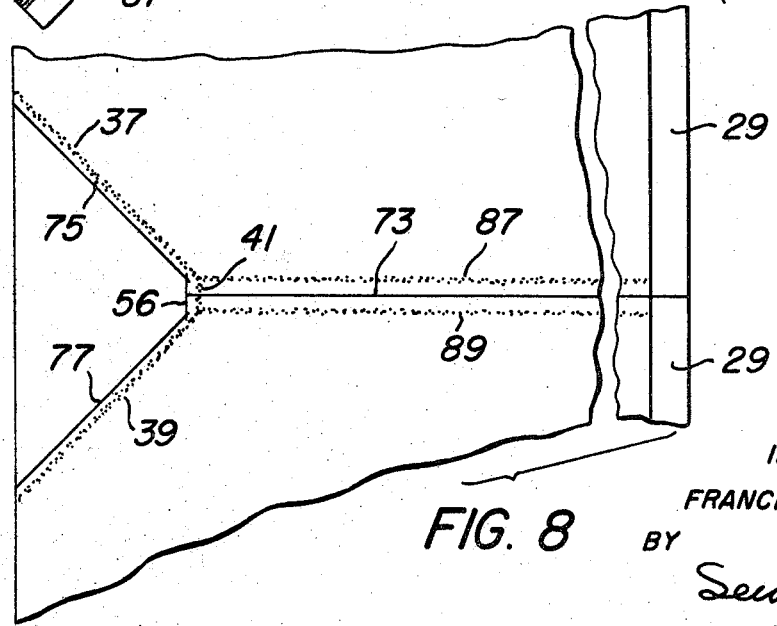

INVENTOR
FRANCIS A. DAVIS, JR.
BY
Seidel & Gonda
ATTORNEYS

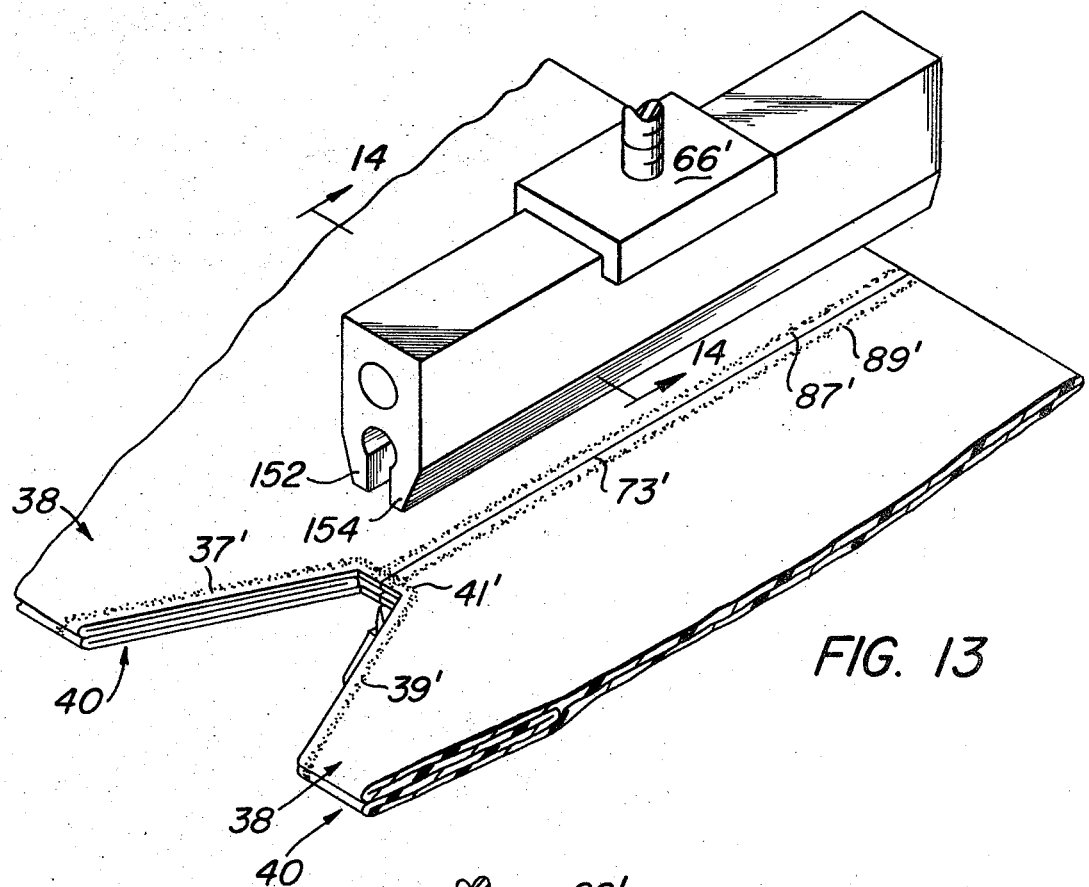
FIG. 13
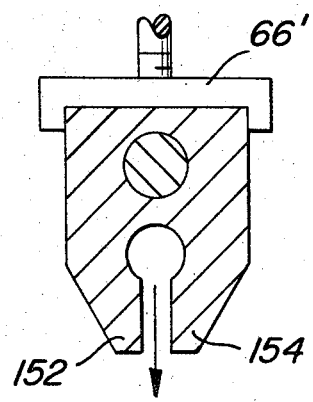
FIG. 14
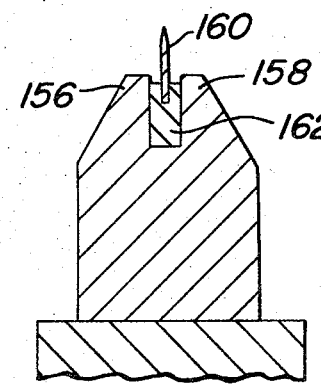
INVENTOR
FRANCIS A. DAVIS, JR.
BY
Seidel & Gonda
ATTORNEYS

METHOD AND APPARATUS FOR MAKING PLASTIC BAGS

This invention relates to a method and apparatus for making bags similar to that disclosed in U.S. Pat. No. 3,282,173. The machine in that patent manufactures open gusset bottom bags having square corners. The present invention is directed to method and apparatus for making modified or shaped gusset bags having beveled or rounded corners. Modified or shaped gusset bags are desirable since they enable the bag to more closely conform to the shape of the article placed therein. For example, when a round object is placed in a square bag, the object is permitted to move in the bag and a substantial portion of the bag is unused.

The present invention accomplishes the object of making modified or shaped bottom gusset bags in a manner which is simple, reliable, inexpensive, and lends itself to high speed production rates. In practicing the present invention, generally V-shaped seam welds are intermittently provided at the fold line of thermoplastic sheet material. If the notch had not been previously cut out, subsequent operations include effecting a transverse seam weld at the apex of each notch and then cutting the notch and along a transverse line between the seam welds.

In order to prevent the four layers of material at the gusset from being welded together, it is conventional to apply a layer of heat resistant ink, shellac or other material to the gusset. The present invention is particularly designed to make bags which are not suited to having such a heat resistant layer or bags on which it is desired that no such heat resistant layer be used. Prevention of welding all four layers of the gusset from being welded is accomplished by dividing the gusset into top and bottom sections which are simultaneously first seam welded and then notched. Welding and then notching is accomplished using equipment similar to that disclosed in U.S. Pat. No. 3,384,528.

When cutting notches in the thermoplastic material, a small generally triangular-shaped tab is produced. The thinness of the material which is commercially used and the large amount of static electricity involved therewith, tends to cause the tabs to stick to various parts of the machinery and accumulate in a manner which interferes with proper functioning of the machinery. Hence, a positive means is provided to remove the cutout tab.

It is an object of the present invention to provide novel method and apparatus for making a modified bottom gusset bag.

It is another object of the present invention to provide novel apparatus and method for making a modified bottom gusset bag of thermoplastic material in a manner which is simple, reliable, and lends itself to high speed production.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a top plan view of the apparatus of the present invention.

FIG. 3 is a sectional detail view taken along the line 3-3 in FIG. 1.

FIG. 4 is a perspective view of the tab.

FIG. 5 is a partial plan view taken along the line 5-5 in FIG. 3.

FIG. 6 is a sectional view taken along the line 6-6 in FIG. 2.

FIG. 7 is a plan view of the transverse seam welder, anvil and cutter.

FIG. 8 is a partial plan view of the seam welds and cuts made between two adjacent bags.

FIG. 9 is a sectional view taken along line 9-9 in FIG. 6.

FIG. 13 is a partial perspective view of transverse welding and slitting apparatus to be used in conjunction with the structure in FIG. 10.

FIG. 14 is a sectional view taken along the line 14-14 in FIG. 13.

Figure 2:
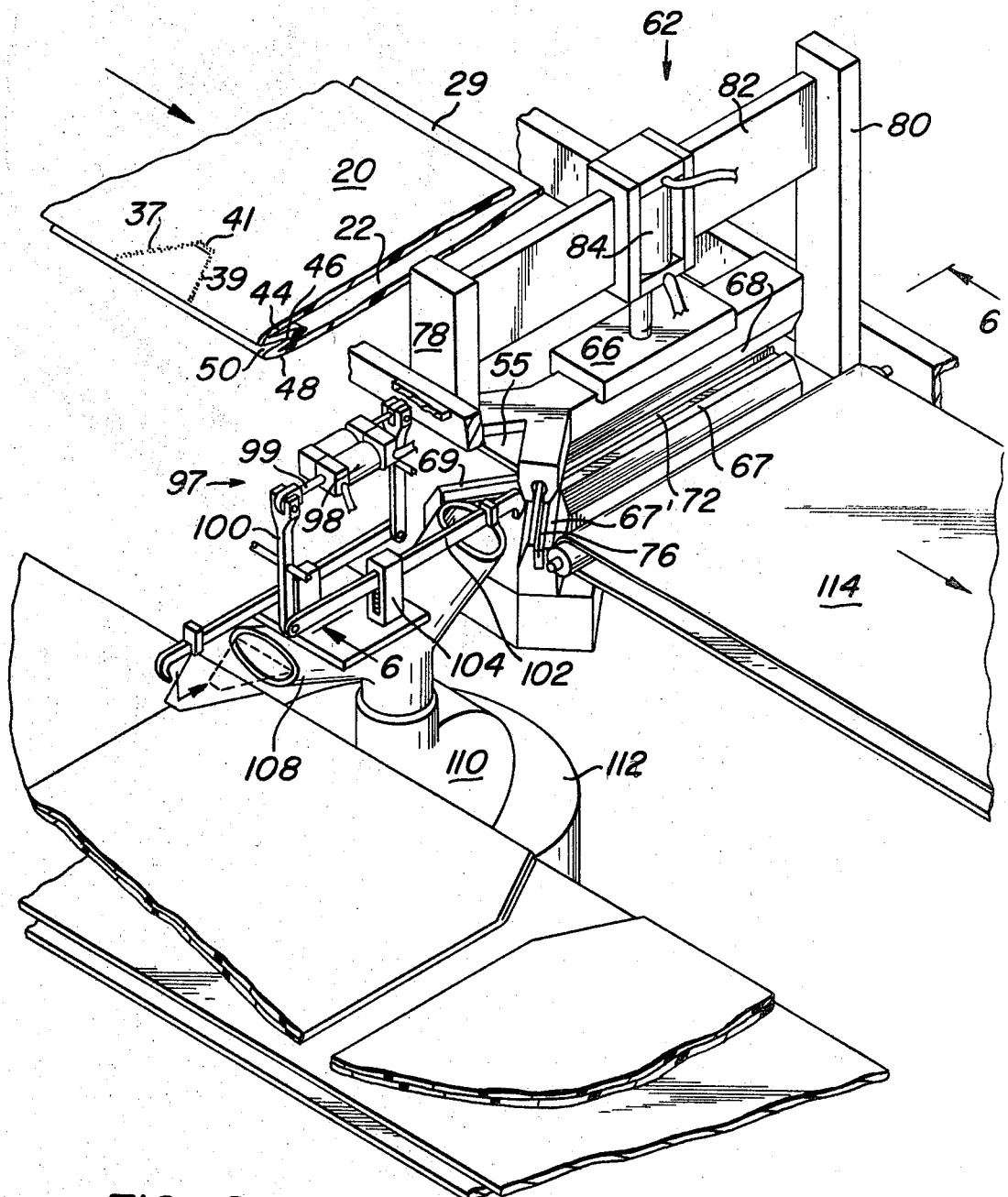
FIG. 2 is a partial perspective view of the apparatus in FIG. 1 on an enlarged scale.

Referring now to the drawings in detail wherein like numerals indicate like elements, there is shown a bag making machine of the present invention designated generally as 10. The machine 10 is intended to have fed therethrough a pair of spaced parallel thermoplastic webs 12 and 14. Thus, the machine 10 has two parallel production lines, each defined by one of the webs. The webs 12 and 14 are folded-over sheets of thermoplastic material having a single fold line 16 and 18 respectively. Along the length of the webs, there is printed markers for breaking the beam of photocell units which intermittently operate the machine 10.

Since each of the webs 12 and 14 are treated in the same manner, only web 12 will be described in detail. It will be understood that the corresponding structure illustrated is utilized in conjunction with web 14. From large rolls, the web 12 is unwound and fed through a takeup roll assembly 24 in a folded manner so as to have a top layer 20 and a bottom layer 22 connected together along the fold line 16. From the assembly 24, a bottom gusset is provided by the plate 26. A similar plate 28 is provided for web 14. The gusset plates 26 and 28 may be of the type as shown in the above-mentioned U.S. Pat. No. 3,282,173.

The gusseted web 12 is then fed in a manner so that a protruding lip or edge portion 29 is provided as shown in the above-mentioned patent so that perforations or slits may be provided by the slitter 30. A similar slitter 32 is provided for web 14. The slitter may be of the type shown in U.S. Pat. No. 3,183,750 which is useful for producing bags of the type shown in U.S. Pat. No. 3,184,055.

Thereafter, the webs are fed to intermittently operated notch welders 34 and 36 respectively. The welders 34 and 36 provide discrete notches defined by seam welds 37, 39 and 41 at spaced points along the length of the fold line 16. The notches are made separately in the top section 38 and bottom section 40 of the gusset as shown more clearly in FIG. 3. A water-cooled anvil 42, which is generally V-shaped in cross section, is provided. Top section 38 is comprised of layers 44 and 46 which overlie the top surface 43 of anvil 42. Bottom section 40 is comprised of layers 48 and 50 which overlie the bottom surface 45 of anvil 42. Surfaces 43 and 45 are defined by a layer of Teflon 47 having a rubber pad undercoating 49. The layer of Teflon 47 prevents the sections 38 and 40 from sticking to the anvil 42.

Seam welds 37 and 39 are made in top section 38 by a V-shaped seam welder 52 carrying a knife 54. Knife 54 cuts slit 56 while the seam welds are made. Seams welds 37 and 39 are made in the bottom section 40 by a V-shaped seam welder 58 carrying a knife 60. Knife 60 performs the same function as knife 54 in the same manner. The welders 52 and 58 are simultaneously reciprocated in a direction perpendicular to surfaces 43 and 45, respectively, by piston and cylinders.

Thereafter, the webs 12 and 14 are fed to intermittent transverse seam welder-cutters 62 and 64, respectively. Each of the welder-cutters 62 and 64 provide a pair of seam welds defining a side edge of the bag and which intersects with the weld 41.

As shown more clearly in FIGS. 7 and 9, the welder-cutter 62 includes a plate-like support 66 having electrically heated, spaced, parallel welding jaws 68 and 70. A cutting blade 72 is disposed between and is longer than anvil jaws 67 and 69. Anvil jaw 67 has an extension 67' and a mating portion 67'' between which is located a blade 76. Anvil jaw 69 has an extension 69' and a mating portion 69'' between which is located a blade 74. Blades 74 and 76 on support 66 do not touch blade 72 but cooperate with blade 72 to form a disconnected Y-shaped cutting blade structure of sufficient length to extend transversely across the web 12. Welding jaws 68 and 70 have extensions so as to be Y-shaped for cooperation with the Y-shaped anvil. However, the extensions on welding jaws 68 and 70 are not heated by heater 71 as illustrated in FIG. 6.

The welder-cutter 62 includes uprights 78 and 80 connected, respectively, to frame portions. The uprights are connected together by a crossbar 82 which supports a cylinder 84. The piston rod 86 projecting downwardly from the cylinder 84 is connected to the top of a holder 88 to which is secured support 66.

Since the converging blades 74 and 76 on the support 66 extend across the gusset, every time a cut is made transversely across the web, a triangular tab 96 is produced by said legs. See FIG. 4. A tab remover designated generally as 97 is synchronized and cooperatively disposed with the welder-cutter 62. The tab removed 97 includes a cylinder 98 having its piston rod 99 connected to a clevis at one end of an arm 100. Arm 100 is pivotably supported intermediate its ends. The end of arm 100 remote from the clevis is pivotably coupled to one end of a shuttle 102. Shuttle 102 extends through a spring housing 104 having a spring therein biasing the shuttle in a counterclockwise direction in FIG. 2. The shuttle 100 at its other end terminates in a sharp point and adjacent thereto has an enlargement for contact with the plate 55 which extends between the portion 67'' and 69'' supported by support 66.

A conduit 106 is provided for receiving the V-shaped tab 96. A conduit 108 is provided for receiving the V-shaped tab from the web 14. Conduits 106 and 108 each communicate with the inlet to a vacuum pump 110 mounted on a hollow drum 112 into which the tabs may be introduced from the outlet of the vacuum pump 110. A shredder may be provided in the drum 112 for shredding the tabs. A conveyor 114 is provided as shown more clearly in FIG. 2 to receive the open gusset bottom side welded bags 116 and convey the same away from the apparatus 10.

The operation of the apparatus 10 is as follows:

Webs 12 and 14 are continuously fed from rolls to the machine 10. The webs are intermittently moved along machine 10. Marks on the webs are detected by the photocell units which interrupt motor 94. The webs are continuously folded and shaped so as to provide a gusset at their fold lines with the webs being in the form of overlapping layers.

Each time that the web 12 is stationary, the perforator unit 30 provides slits in the lip 29. Also, when the web 12 is stationary, motive fluid will be introduced into cylinder 84 to move the support 66 downwardly to simultaneously cut the web 12 transversely and effect a pair of spaced side welds to the cut portions of the web 12 as will be explained hereinafter. Each time the web is stationary, the welders 52 and 58 reciprocate toward the anvil 42 to form the V-shaped welds 37, 39 and 41 in each of the sections 38 and 40. Also, slits 56 are formed at the same time by knives 54 and 60.

When the support 66 moves downwardly, motive fluid is simultaneously introduced into the cylinder 98 which causes the arm 100 to move the shuttle 102 inwardly so that the free end of shuttle 102 is below the support 66. As the support 66 continues to move downwardly, it contacts the enlarged portion on the terminal end of shuttle 102 and moves it downwardly so that the point on the shuttle 102 digs into the gusseted portion of the web 12 at a location which will be part of the triangular shaped tab 96 cut by the blades 74 and 76. While the shuttle 102 pivots in a clockwise direction in FIG. 2 due to contact with the support 66, the spring in housing 104 is compressed slightly.

When the jaws 68 and 70 engage the web 12, welds 87 and 89, respectively, are formed as shown in FIG. 8. Welds 87 and 89 each overlap one end of weld 41. At the same time, knife 72 slits the web 12 along line 73 which intersects slit 56. Also, knife blade 74 slits the notch along line 75 which intersects slit 56 and knife blade 76 slits the notch along line 77 which intersects slit 56.

As soon as the web 12 commences to move again, motive fluid is introduced into cylinder 84 to retract the support 66 and motive fluid is introduced into cylinder 98 to retract the shuttle 102. As the shuttle 102 retracts, it pulls the triangular shaped tab 96 into the conduit 106 in which a suction is effected by way of pump 110. Pump 110 discharges the tab 90 into tank 112. Conveyor 114 transports the bag 116 to a stacking area.

The use of a pair of welders to separately form the notch defined by welds 37, 39 and 41 in each of the gusset sections 38 and 40 enables bags to be made from heavy thermoplastic (such as .002 to .020 inches thick) without using a heat resistant coating on the gusset. Because of the nature of the heavy thermoplastic, the side edges of the bags 116 are separately welded by jaws 68 and 70. As a result thereof, the corners at the intersection of welds 37 and 67, for example, are very strong as compared with prior arrangements wherein this intersection is the weakest portion of the bag.

Referring to FIGS. 10—14, there is illustrated another embodiment of the present invention designated generally as 10'. Apparatus 10' is identical with apparatus 10 except as will be made clear hereinafter. In apparatus 10', the notch welders weld and cut the notches before the material is transported to the next station at which station the transverse cutting and welding will take place. Corresponding elements in apparatus 10 and 10' are provided with corresponding primed numerals.

Figure 10:
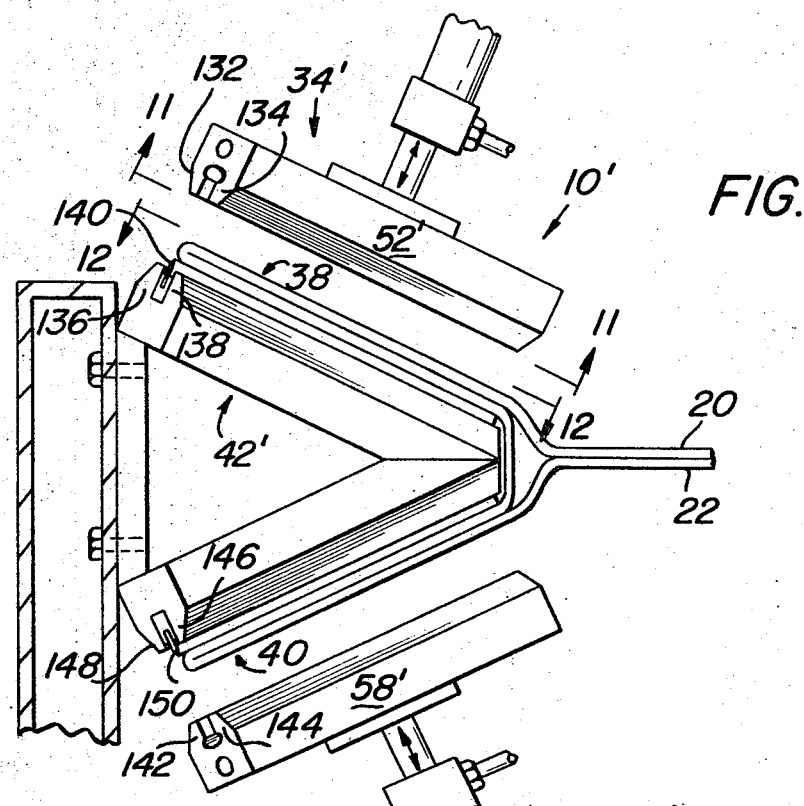
FIG. 10 is a view similar to FIG. 3 but illustrating another embodiment.
Figure 11:
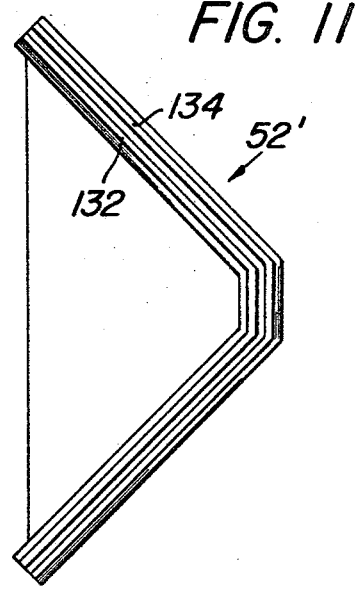
FIG. 11 is a bottom view taken along the line 11-11 in FIG. 10.

As shown more clearly in FIG. 10, the notch welder 34' includes a V-shaped seam welder 52' which is flattened at its apex and comprised of welding jaws 132 and 134. The anvil 42' is water-cooled and is provided with anvil jaws 136 and 138 which cooperate with jaws 132 and 134. A blade 140 is provided between the jaws 136 and 138.

The notch welder 34' also includes a generally V-shaped seam welder 58' having jaws 142 and 144 adapted to cooperate with jaws 146 and 148 on the juxtaposed mating anvil. A knife blade 150 is carried between the jaws 146 and 148.

Figure 12:
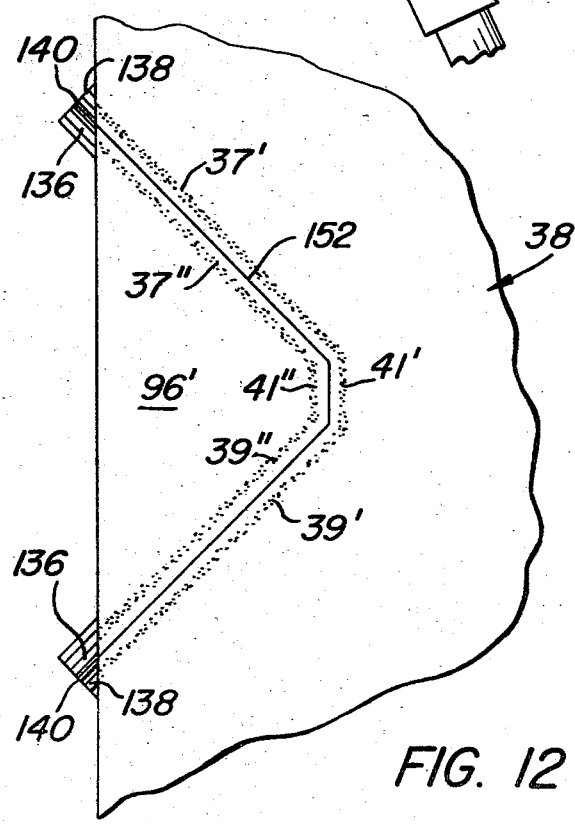
FIG. 12 is a plan view taken along the line 12-12 in FIG. 10.

As shown more clearly in FIG. 12, the notch welder 34' applies a pair of spaced parallel seam welds 37' and 37'' which converge toward mating seam welds 39' and 39'' to intersect the seam welds 41' and 41''. The blade 140 cuts the notch 96' along the line 152 disposed between the seam welds defining the notch. Means such as the above-described shuttle is provided to remove the tab 96' before the material is moved to the next station. At the next station, the material is cut and welded transversely at a location corresponding generally to the apex of the V-shaped notch. See FIGS. 13 and 14. The heated welding head comprises jaws 152 and 154 depending from the support 66'.

An anvil is provided having anvil jaws 156 and 158 for cooperation with jaws 152 and 154. A blade 160 is supported in a carrier 162 between the jaws 156 and 158. Carrier 162, and the corresponding carrier for the above-described blades, are preferably made from a heat-insulating material. Blade 160 cuts the material transversely along line 73'. Jaws 152 and 154 seam weld the material along seam welds 87' and 89' respectively.

The present invention may be embodied in other specific forms without departing from the spirit or essential attributes thereof and, accordingly, reference should be made to the appended claims, rather than to the foregoing specification as indicating the scope of the invention.

I claim:

1. A method of making bags of thermoplastic material comprising the steps of forming a gusset along a fold line of a web of thermoplastic material, separating the gusset into top and bottom sections, separately welding V-shaped notches in the top and bottom sections at a first station, moving the web to a second station, providing a pair of transverse spaced parallel seam welds at a second station in a manner whereby the seam welds intersect the apex portion of the notches, cutting along the V-shaped notches to define tabs which are discarded as scrap, and cutting between the transverse parallel seam welds to define discrete bags.

2. A method in accordance with claim 1 including the step of providing a slit at the first station within the notch adjacent the apex of the notch in both of the top and bottom sections.

3. A method in accordance with claim 2 wherein said cutting step includes using three disconnected blades, each of which intersects a portion of the slit.

4. A method in accordance with claim 1 wherein said step of welding notches includes positioning the top and bottom sections adjacent to one of the converging surfaces of a generally V-shaped anvil.

5. A method in accordance with claim 2 wherein said step of welding notches includes providing a generally V-shaped notch which is truncated generally parallel to but spaced from the slit.

6. Apparatus for making bags of thermoplastic material comprising means for providing a gusset along a fold line of thermoplastic material, an anvil having converging surfaces for disposition between top and bottom sections of the gusset, a notch welder means juxtaposed to said surfaces for intermittently welding generally V-shaped notches at spaced points along the gusset sections, and a welder-cutter downstream from said notch welder, said welder-cutter including spaced parallel jaws for providing seam welds transversely of the thermoplastic material and extending for an apex portion of the notches, said welder-cutter including a blade means for cutting the material between the welds formed by the jaws.

7. Apparatus in accordance with claim 6 wherein said blade means is comprised of three disconnected blades mounted on an anvil below the plane of the thermoplastic material.

8. Apparatus in accordance with claim 6 wherein said notch welder means includes a pair of V-shaped welding jaws mounted for movement toward and away from the anvil, said anvil having mating jaws, each anvil jaw including a knife blade for cutting each section of the gusset.

9. Apparatus in accordance with claim 8 wherein each anvil blade is V-shaped